3,234,191
POLYMERS OF VINYLBORON COMPOUNDS
William G. Woods, Anaheim, Irving S. Bengelsdorf, Costa Mesa, and Don L. Hunter, Long Beach, Calif., assignors to United States Borax & Chemical Corporation, Los Angeles, Calif., a corporation of Nevada
No Drawing. Filed Sept. 20, 1961, Ser. No. 139,343
3 Claims. (Cl. 260—80)

The present invention relates to a new class of polymers prepared from vinyldioxaborinanes.

The term "polymer" is used generically in the present specification and appended claims, and is intended to include within its meaning both the homopolymers and the copolymers of the vinyldioxaborinanes. A homopolymer is obtained from the reaction of a vinyldioxaborinane with itself, while a copolymer is obtained from the intermolecular reaction of a vinyldioxaborinane with a compound which is different than the vinyldioxaborinane and which contains unsaturated $H_2C=C<$ groups, such as, for example styrene, halogen and alkyl substituted styrenes, butadiene, diallyl phthalate, methyl metharcrylate, acrylamide, vinyl chloride, vinyl acetate, vinyl isobutyl ether, and acrylonitrile.

It is the principal object of the present invention to provide a new class of polymers, including both the homopolymers and copolymers of the vinyldioxaborinanes.

It is a further object of this invention to provide means for preparing this new class of boron-containing polymers.

Other objects of the present invention will appear as the description proceeds.

To the accomplishment of the foregoing and related ends, said invention then comprises the features hereinafter fully described and particularly pointed out in the claims, the following description setting forth in detail certain illustrative embodiments of the invention, these being indicative, however, of but a few of the various ways in which the principle of the invention may be employed.

Broadly stated the present invention comprises polymers of vinyldioxaborinanes.

The vinyldioxaborinanes are six membered ring compounds; the ring consists of one boron atom, two oxygen atoms, and three carbon atoms, and the vinyl radical is always bonded directly to the boron atom. Thus, the vinyldioxaborinanes are glycol ethyleneboronates as illustrated by the formula:

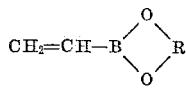

where R is an alkylene radical 3 carbon atoms in length and containing a total of from 3 to 20 carbon atoms.

The following list is a partial enumeration of the vinyldioxaborinane monomers applicable to the present invention:

2-vinyl-4,4,6-trimethyl-1,3,2-dioxaborinane
2-vinyl-1,3,2-dioxaborinane
2-vinyl-4-propyl-5-ethyl-1,3,2-dioxaborinane
2-vinyl-4,4-dimethyl-1,3,2-dioxaborinane
2-vinyl-4-methyl-1,3,2-dioxaborinane
2-vinyl-5,5-dimethyl-1,3,2-dioxaborinane
2-vinyl-4,4,5-trimethyl-1,3,2-dioxaborinane
2-vinyl-5-methyl-5-ethyl-1,3,2-dioxaborinane
2-vinyl-5-methyl-5-propyl-1,3,2-dioxaborinane The vinyldioxaborinanes are believed to be new chemical compounds and their methods of preparation are more fully described and specifically claimed in our copending application entitled, "Vinylboron Compounds and Means for Preparing the Same," Serial No. 226,743, filed September 27, 1962, which is in turn a continuation-in-part of application Serial No. 135,555, filed August 24, 1961, and now abandoned.

The following examples are illustrative of methods for preparing the vinyldioxaborinanes monomers.

I. A 500 ml. round-bottomed flask containing 75 ml. of ether was cooled to −70° C. With constant agitation, 54 ml. (0.25 mole) of 2-n-butoxy-4,4,6-trimethyl-1,3,2-dioxaborinane and 96.2 ml. (0.25 mole) of 2.60 M vinyl magnesium chloride solution in tetrahydrofuran were simultaneously added in increments to the ether over a 16 minute interval. A solid precipitate formed which dissolved when the reaction mass was allowed to warm to room temperature. About one-half of the tetrahydrofuran and all of the ether was then remover by distillation at atmospheric pressure. The pressure was then reduced to about 1 mm. and the temperature increased to about 210° C., and the liquid which distilled off was recovered. This distillate was then fractionally distilled and 30.65 grams (79.2% yield) of 2-vinyl-4,4,6-trimethyl-1,3,2-dioxaborinane, B.P. 69–70° C. at 35 mm., was recovered.

II. A 2 liter round-bottomed flask containing 200 ml. of ether was chilled to −70° C. With constant agitation 172 grams (1 mole) of 2-n-butoxy-4-methyl-1,3,2-dioxaborinane and 386 ml. (1 mole) of 2.59 M vinyl magnesium chloride solution in tetrahydrofuran were simultaneously added in increments to the ether over a 43 minute interval. A solid precipitate formed which dissolved when the reaction mass was allowed to warm to room temperature. About one-half of the tetrahydrofuran and all of the ether was removed by distillation at atmospheric pressure. Five hundred ml. of mineral oil was then added to the reaction vessel and the reaction mass was heated to about 200° C., and the liquid which distilled off was recovered. This distillate was then fractionally distilled and 90.5 grams (71.4% yield) of 2-vinyl-4-methyl-1,3,2-dioxaborinane, B.P. 64–65° C. at 40 mm., was recovered.

There are numerous unsaturated compounds containing $CH_2=C<$ groupings which are different than the vinyldioxaborinanes and which are copolymerizable therewith. The comonomers of particular interest for use in the present invention are the vinyl aromatic compounds such as styrene and substituted styrenes, vinyl aliphatic compounds such as acrylonitrile, acrylic acid, acrylamide, various substituted acrylonitriles, acrylic esters, and acrylamides, allylic esters, and various other allylic compounds.

The following is illustrative of some of the more specific unsaturated compounds which are applicable for use in the prepartion of the copolymers of the present invention:

| | |
|---|---|
| styrene | methacrylonitrile |
| butadiene | ethacrylonitrile |
| o-chlorostyrene | ethyl acrylate |
| p-ethylstyrene | methyl methacrylate |
| α-methylstyrene | acrylamide |
| vinyl acetate | methacrylamide |
| vinyl chloride | vinyl acrylate |
| diallyl phthalate | vinyl cyclohexane |
| allyl acrylate | vinyl cyclohexene |
| diallyl maleate | methyl vinyl ketone |
| allyl acetate | vinyl isobutyl ether |
| acrylonitrile | N-vinyl pyrrolidone |

It is to be clearly understood that the foregoing list is only a partial enumeration of the comonomers applicable to the present invention and is not intended to limit the invention.

The polymers of the present invention are prepared by polymerizing a vinyldioxaborinane alone or admixed with different unsaturated compounds containing $CH_2=C<$ groups which are copolymerizable with the vinyldioxaborinanes. Polymerization of the vinyldioxaborinanes can be initiated by catalysts or the polymerization reactions can be initiated thermally or by the use of ultraviolet light. In the preferred embodiment of our invention the polymers are prepared under anhydrous conditions with the aid of a free-radical or an ionic polymerization initiator catalyst.

The following list is illustrative of a few of the polymerization catalysts applicable to the present invention:

Free-radical catalysts:
 α,α'-azo-bis-isobutyronitrile
 Dimethyl-α,α'-azo-bis-diisobutyrate
 Benzoyl peroxide
 t-Butyl hydroperoxide Anionic catalysts:
 Metallic sodium
 Metallic potassium
 Sodium naphthalene complex
 Amylsodium
 Amylpotassium Cationic catalysts:
 Boron trifluoride (gaseous)
 Boron trifluoride-etherate complex
 p-Toluenesulfonic acid
 Stannic chloride
 Aluminum chloride The vinyldioxaborinanes alone or admixed with copolymerizable compounds can be polymerized in bulk in anhydrous heterogeneous mixtures, or in anhydrous solutions to yield the desired homopolymers or copolymers. The choice of solvent used to act as the reaction medium is dependent on the catalyst and polymerizable materials used in any specific polymerization reaction. Benzene, toluene, xylene, hexane, terahydrofuran, chlorobenzene, chloroform, methylene chloride, ether, and carbon tetrachloride are but a few of the solvents which are applicable for use in performing the present polymerization reactions. The polymers of the present invention can be recovered by evaporation, freeze-dry techniques, or by precipitation with a polar solvent.

The polymerization reactions can be performed over a wide temperature range; the upper limit being the decomposition temperature of any of the monomeric compounds present. Generally, the reactions are carried out at the boiling point of the lowest boiling constituent of the reaction mass on the order of from about 20° C. to about 150° C. However, when certain of the ionic catalysts are used to initiate the polymerization reaction, it is advantageous to carry out the polymerization at much lower temperatures, from about −80° C. to about 20° C. Thus, the preferred temperature range for carrying out the polymerization reactions will be from about −80° C. to about 150° C.

The homopolymers of the vinyldioxaborinanes will be found to have a recurring monomeric unit having the formula:

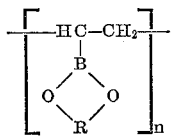

where R is an alkylene radical 3 carbon atoms in length and containing a total of from 3 to 20 carbon atoms. These homopolymers which range from viscous polymeric gels to glassy solids with relatively low softening points, are resistant to oxidation and hydroylsis and vary in their solubility in the common nonpolar organic solvents.

The copolymers of the present invention comprise from about 1% to about 99% by weight of the above monomeric unit introduced by the vinyldioxaborinane and are prepared, as previously described, from an admixture of a vinyldioxaborinane and unsaturated compounds having $CH_2=C<$ groups and which are copolymerizable with the vinyldioxaborinane. These copolymers have profoundly different physical properties than the polymers prepared from the unsaturated compounds themselves. For example, a vinyldioxaborinane when copolymerized in various proportions, with acrylonitrile, provides polymeric materials having definite softening points and which are soluble in the common nonpolar organic solvents, whereas the polyacrylonitriles themselves do not have definite softening points and they are not soluble in the common nonpolar solvents. Furthermore, fibers prepared from these acrylonitrile-vinyldioxaborinane copolymers also have the much desired property of increased dye receptivity.

So that the present invention can be more clearly understood, the following illustrative examples are given:

I. To a 500 ml. round-bottomed flask equipped with a magnetic stirrer, a nitrogen inlet and a reflux condenser and containing about 100 ml. of benzene was placed 20 grams (0.13 mole) of 2-vinyl-4-4-6-trimethyl-1,2-dioxaborinane and 0.2 gram (0.0018 mole) of α,α'-azo-bis-isobutyronitrile, and the reaction mass was then heated at reflux under a nitrogen atmosphere with constant agitation. The benzene was then removed by freeze-drying and a clear homopolymer which flows slowly at room temperature and is soluble in the common nonpolar organic solvents was recovered.

II. To a 500 ml. round-bottomed flask equipped with a magnetic stirrer, a nitrogen inlet and a reflux condenser and containing about 100 ml. of toluene was placed 20 grams (0.16 mole) of 2-vinyl-4-methyl 1,3,2-dioxaborinane and 0.24 gram (0.001 mole) of benzoyl peroxide, and the reaction mass was then heated at reflux under a nitrogen atmosphere with constant agitation. The toluene was removed by freeze-drying and a clear tough solid homopolymer which is partially soluble in the common nonpolar solvents was recovered.

III. To a 500 ml. round-bottomed flask equipped with a magnetic stirrer, a nitrogen inlet and a reflux condenser and containing about 100 ml. of benzene was added 11.2 grams (0.1 mole) of 2-vinyl-1,3,2-dioxaborinane and 0.1 gram (0.0009 mole) of α,α'-azo-bis-isobutyronitrile. The reaction mass was then heated at about 60° C. for about 4 hours under a nitrogen atmosphere with constant agitation. The benzene was then removed by freeze-drying and a clear glassy homopolymer which is partially soluble in the common nonpolar organic solvents was recovered.

IV. To a 500 ml. round-bottomed flask equipped with a magnetic stirrer, a nitrogen inlet and a reflux condenser and containing about 100 ml. of benzene was placed 15.5 grams (0.149 mole) of styrene, 15.0 grams (0.097 mole) of 2-vinyl-4,4,6-trimethyl-1,3,2,-dioxaborinane and 0.3 gram (0.0018 mole) of α,α'-azo-bis-isobutyronitrile. The reaction mass was then heated at reflux under a nitrogen atmosphere with constant agitation. The benzene was removed by freeze-drying and a white glassy friable solid copolymer, soluble in the common nonpolar organic solvents, was recovered.

V. To a 500 ml. round-bottomed flask equipped with a magnetic stirrer, a nitrogen inlet and a reflux condenser and containing about 100 ml. of toluene was placed 11.8 grams (0.1 mole) of p-methylstyrene and 10 grams (0.08 mole) of 2-vinyl-4-methyl-1,3,2-dioxaborinane. To this was added 0.3 gram (0.013 mole) of sodium as a dispersion in toluene. After about 16 hours of shaking at about 20° C., the reaction mass was allowed to stand at room temperature. The product, a solid white glassy copolymer, was precipitated from the solution by the addition of methanol and was recovered by decanting off the liquid portion of the reaction mass.

VI. To a 500 ml. round-bottomed flask equipped with a nitrogen inlet, a magnetic stirrer and a reflux condenser and containing about 100 ml. of benzene was placed 15.0 grams (0.15 mole) of methyl methacrylate, 15.0 grams (0.097 mole) of 2-vinyl-4,4,6-trimethyl-1,3,2-dioxaborinane and 0.3 gram (0.0018 mole) of α,α'-azo-bis-isobutyronitrile. The reaction mass was then heated at reflux under a nitrogen atmosphere with constant agitation. The benzene was then removed by freeze-drying and a clear glassy friable solid, soluble in the common nonpolar organic solvents, was recovered.

VII. To a one liter round-bottomed flask equipped with a magnetic stirrer, a nitrogen inlet and a reflux condenser and containing about 200 ml. of methylene chloride was added 24.6 grams (0.10 mole) of diallyl phthalate and 11.2 grams (0.10 mole) of 2-vinyl-1,3,2-dioxaborinane. The solution was cooled to −20° C. and 0.5 gram (0.0074 mole) of boron trifluoride dissolved in diethyl ether was added. The reaction was then allowed to warm slowly to room temperature under a nitrogen atmosphere with constant agitation. The copolymer was then recovered by destroying the catalyst with methanol, filtering, and removing the methylene chloride.

VIII. To a 500 ml. round-bottomed flask equipped with a magnetic stirrer, a nitrogen inlet and a reflux condenser and containing about 100 ml. of benzene was added 4.9 grams (0.092 mole) of acrylonitrile, 14.2 grams (0.92 mole) of 2-vinyl-4,4,6-trimethyl-1,3,2-dioxaborinane and 0.2 gram (0.0012 mole) of α,α'-azo-bis-isobutyronitrile. The reaction mass was then heated at about 80° C. under a nitrogen atmosphere with constant agitation. The benzene was then removed by freeze-drying and an off-white colored friable solid copolymer, soluble in the common nonpolar organic solvents, was recovered.

IX. To a 500 ml. round-bottomed flask equipped with a magnetic stirrer, a nitrogen inlet and a reflux condenser and containing about 100 ml. of n-heptane was added 7.1 grams (0.10 mole) of acrylamide, 12.6 grams (0.10 mole) of 2-vinyl-4-methyl-1,3,2-dioxaborinane and 1.46 grams (0.01 mole) of t-butyl hydroperoxide. The reaction mass was then heated at reflux in a nitrogen atmosphere with constant agitation. The product, a pale-colored, glassy, friable solid, was isolated by pouring the solution into excess methanol and filtering off the liquid portion of the resultant slurry.

X. To a 500 ml. round-bottomed flask equipped with a magnetic stirrer, a nitrogen inlet and a reflux condenser and containing about 100 ml. of benzene was added 14.5 grams (0.113 mole) of n-butyl acrylate, 9.5 grams (0.085 mole) of 2-vinyl-1,3,2-dioxaborinane and 0.24 gram (0.01 mole) of benzoyl peroxide. The reaction mass was then heated at reflux under a nitrogen atmosphere with constant agitation. The benzene was then removed by freeze-drying and a colorless glassy copolymer which is soluble in the common nonpolar organic solvents was recovered.

The polymers of the present invention have a wide variety of industrial applications. Many of the polymers can be prepared having low softening points and find utility as polymeric fluids for effective neutron absorption applications. The present polymers can be used as molding compositions, with or without the addition of fillers; they can be cast, and they can be used as sizing, adhesive and binding agents for paper, cotton and other cellulosic materials. Various of the polymers can also be used in the preparation of synthetic fibers which are readily receptive to dyes.

Other modes of applying the principle of the invention may be employed, change being made as regards the details described, provided the features stated in any of the following claims or the equivalent of such be employed.

We, therefore, particularly point out and distinctly claim as our invention:

1. Vinyldioxaborinane homopolymers having the recurring structural unit

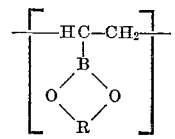

where R is an alkylene radical 3 carbon atoms in length and containing a total of from 3 to 20 carbon atoms.

2. A homopolymer of 2-vinyl-4-methyl-1,3,2-dioxaborinane having the recurring structural unit of the formula

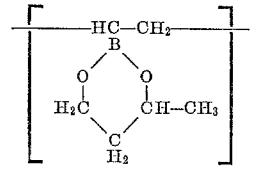

3. A homopolymer of 2-vinyl-4,4,6-trimethyl-1,3,2-dioxaborinane having the recurring structural unit of the formula

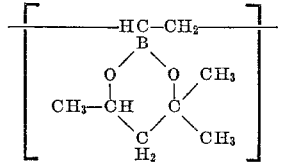

References Cited by the Examiner
UNITED STATES PATENTS
3,135,781   6/1964   Kitasaki et al. _____ 260—462
FOREIGN PATENTS
1,224,181   6/1960   France.

JOSEPH L. SCHOFER, *Primary Examiner.*